United States Patent [19]

Bates et al.

[11] Patent Number: 5,367,513
[45] Date of Patent: Nov. 22, 1994

[54] FOCUS AND TRACKING SERVO DECOUPLING SYSTEM

[75] Inventors: Keith A. Bates; Nhan X. Bui; Delbert A. Hansen, all of Tucson, Ariz.

[73] Assignee: International Business Machines Corporation, Armonk, N.Y.

[21] Appl. No.: 148,695

[22] Filed: Nov. 5, 1993

[51] Int. Cl.$^5$ ............................................. G11B 7/095
[52] U.S. Cl. .............................. 369/44.29; 369/44.32; 369/54
[58] Field of Search .................... 369/44.25–44.27, 369/44.29, 44.32, 44.34–44.36, 54, 44.41; 250/201.5

[56] References Cited

U.S. PATENT DOCUMENTS

| | | | |
|---|---|---|---|
| 4,580,255 | 4/1986 | Inoue et al. | |
| 4,688,202 | 8/1987 | Mukai et al. | |
| 4,703,466 | 10/1987 | Konno | |
| 4,747,089 | 5/1988 | Eguchi et al. | |
| 4,841,509 | 6/1989 | Kamisada et al. | |
| 4,942,564 | 7/1990 | Hofer et al. | 369/54 X |
| 5,103,439 | 4/1992 | Bierhoff et al. | 369/44.29 X |
| 5,113,386 | 5/1992 | Whitehead et al. | 369/44.41 |
| 5,142,520 | 8/1992 | Yanagi et al. | 369/44.32 X |
| 5,148,423 | 9/1992 | Gleim | 369/44.29 |
| 5,164,932 | 11/1992 | Fennema et al. | 369/44.29 |
| 5,199,011 | 3/1993 | McDonald et al. | 369/44.34 X |

FOREIGN PATENT DOCUMENTS

WO88/03671  5/1988  WIPO .

OTHER PUBLICATIONS

*IBM Technical Disclosure Bulletin*, vol. 28, No. 4, Sep. 1985, pp. 1708–1709 "Calibrating Optical-Disk Tracking Circuits".

Primary Examiner—W. R. Young
Attorney, Agent, or Firm—Greenlee and Winner

[57] ABSTRACT

A circuit for electronically compensating for optical and mechanical instabilities induced into the focus control and tracking control servo circuits of an optical disk apparatus. The circuit contains a filter and a variable gain amplifier for passing a tracking error signal compensation component at a selected frequency within the range of frequencies in which mechanical resonance is significant and at a magnitude equal to the focus error signal component at that frequency. The result is the electronic elimination of optical feedthrough at mechanically resonating frequencies. A calibration circuit establishes the compensation component magnitude for each optical disk inserted into the apparatus.

14 Claims, 4 Drawing Sheets

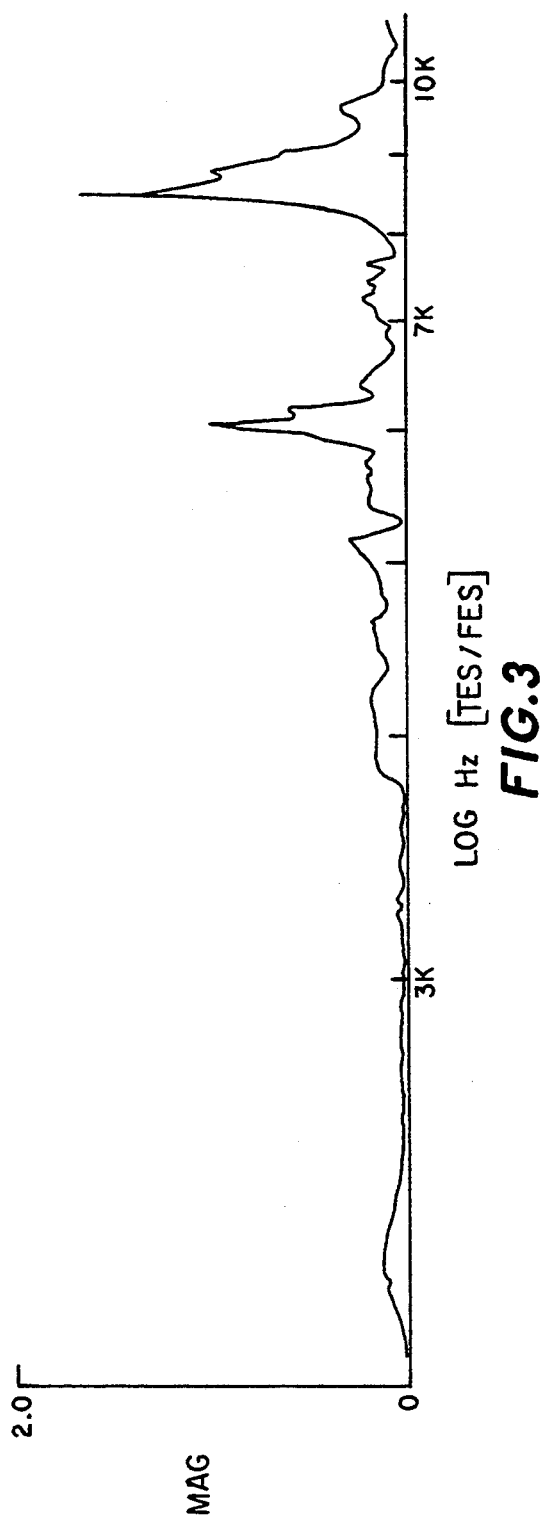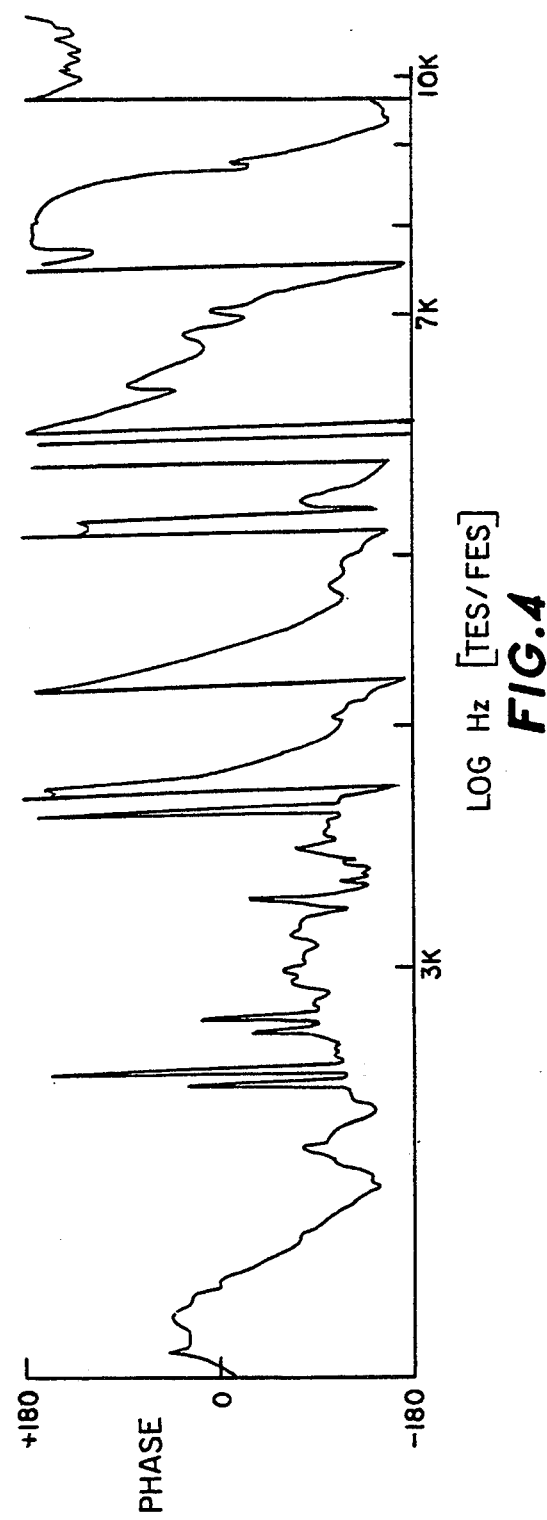

FOCUS AND TRACKING SERVO DECOUPLING SYSTEM

This invention relates to optical disk apparatus and more particularly to the elimination of resonating conditions between the focus control servo system and the tracking control servo system.

BACKGROUND OF THE INVENTION

Optical disk devices utilize laser light for recording data onto and sensing data from storage media. These devices are often used for the storage of computer-prepared data and have value in their ability to store large quantities of data on a single disk. The disk media for use in such devices is reactive to light and is heated thereby to levels which enable the recording of data. To write data on optical media a laser beam is focused onto the media surface and the laser is operated at a relatively high power level in order to alter the media in accordance with an input data stream. In reading data back, the laser power level is controlled to a lower level so that the media is not altered by the laser beam but the reflected light indicates the presence or absence of previously recorded media alterations.

The surface of optical disk media is manufactured with closely spaced grooves, either spiral or concentric. Data recorded on the media is recorded within the grooves. Unalterable identification headers are also included within the grooves. These headers contain information about the disk and enable the system to perform properly. They include identification information for each track so that the system can locate itself on the groove (track) to be written or read.

In order to maintain the laser beam in proper focus on the surface of the optical disk, a focus servo system is provided to move the lens as needed to maintain focus. Once the proper track has been found so that read and write operations can commence, a tracking servo system is operated to maintain the position of the laser beam on the correct track.

One well known source of disturbance in the focus servo system is termed "optical feedthrough" and is due to the inability of the tracking servo to maintain perfect tracking. That is, if the focused laser spot is exactly in the bottom of the groove, and if that position is continually maintained as the disk rotates, no disturbance to the focus is created. However, should the tracking drift slightly, the laser spot moves from the bottom to the sides of the groove and then, under the influence of the tracking servo, back to the bottom and perhaps then to the other side of the groove. The uneven surfaces of the groove create a difference in the light reflection patterns, thus causing changes in the focus error signal. The tracking error signal is also a function of this same movement, thus relating the tracking error signal (TES) to the optical feedthrough feedback into the focus error signal (FES). There are many schemes devised to correct for and eliminate the effect of optical feedthrough.

In addition to the coupling of the focus servo loop and the tracking servo loop by optical feedthrough, some disk drives may also be subject to mechanical resonating conditions at certain frequencies. If mechanical resonance is present, movement of the lens in the focus direction creates a movement in the tracking system because the two are mechanically coupled. When the tracking system is disturbed, a further disturbance occurs in the focus system due to optical feedthrough. Further disturbance in the focus system creates a further disturbance in the tracking system, etc., and the entire system becomes unstable.

It is the object of this invention to provide electronic means for correcting the optical and mechanical system interactions that produce unstable servo systems.

SUMMARY OF THE INVENTION

Briefly stated, this invention provides a circuit for producing a compensation signal which compensates for and cancels out the effect of optical feedthrough over a relatively narrow band of frequencies where mechanical resonating conditions are significant. The frequency and amplitude of the compensation signal are established at a selected frequency within the range of mechanical resonance to counteract the optical feedthrough effect at resonating frequencies by summing the compensation signal with the focus error signal. In that manner, the effect of optical feedthrough is decoupled at resonating frequencies and the focus and tracking systems are stable.

A calibration circuit is provided to establish the proper amplitude for the compensation signal. Whenever a new optical disk is inserted, the calibration circuit is utilized to recalibrate the compensation signal since each disk provides its own groove topology. The calibration circuit provides a filter for sending a "disturbance" signal to the tracking servo in order to generate a tracking error signal with a component at the selected frequency. That component is compared with the previously set compensation signal and adjustments are made to establish a match.

BRIEF DESCRIPTION OF THE DRAWING

The above-mentioned and other features and objects of the invention and the manner of attaining them will become more apparent and the invention itself will best be understood by reference to the following description of embodiments of the invention taken in conjunction with the accompanying drawing, a brief description of which follows.

FIG. 3 shows the frequency and amplitude response of the tracking error signal to the focus error signal, providing a measure of the mechanical resonance of the system.

FIG. 4 shows the phase response of the tracking error signal to changes in the focus error signal.

DETAILED DESCRIPTION

Figure 1:
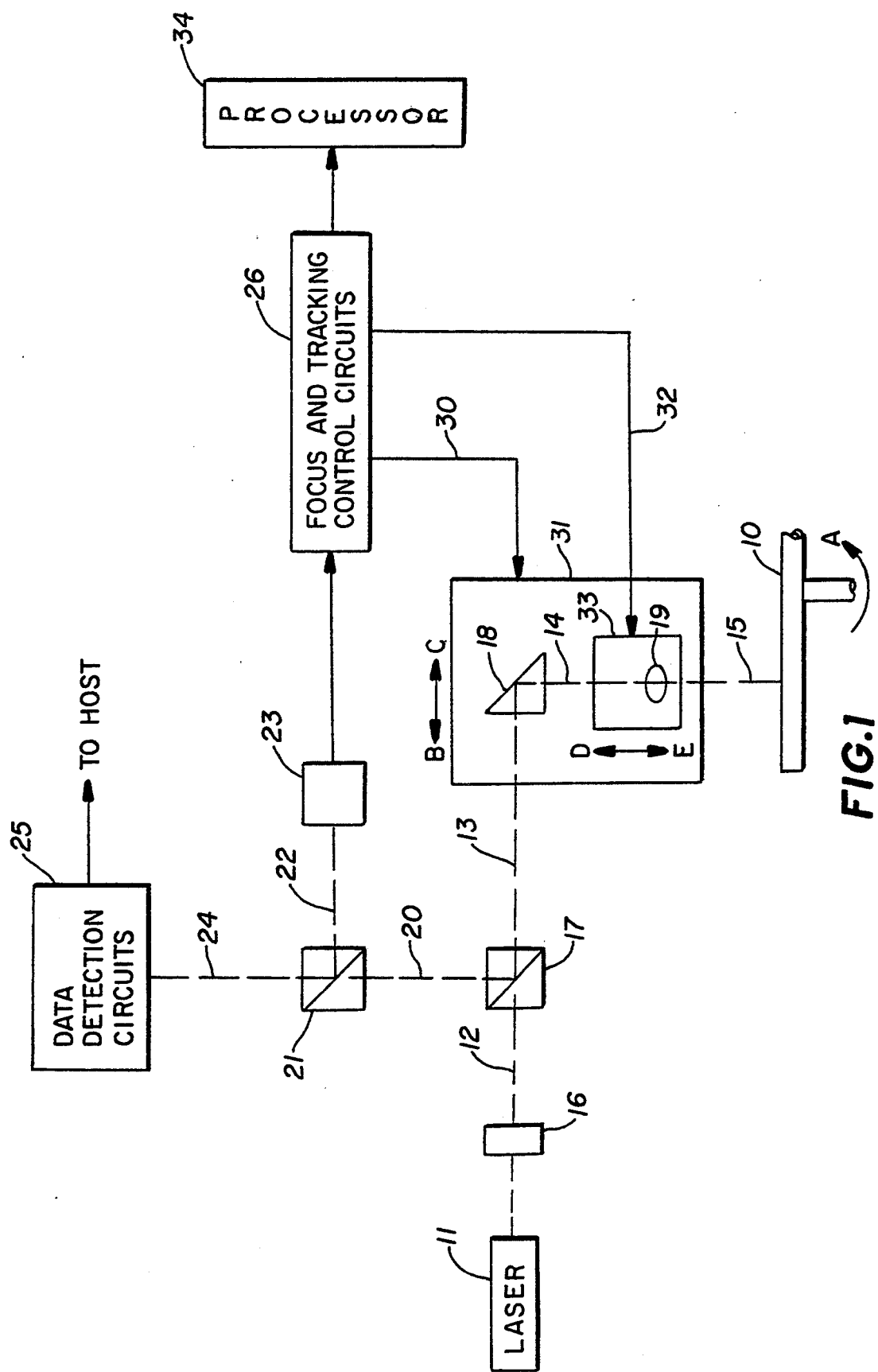
FIG. 1 shows an optical data storage device with the focus and tracking control circuits.

When reference is made to the drawing, like numerals will indicate like parts and structural features in the various figures.

FIG. 1 shows an optical data storage device. An optical disk 10 is mounted for rotation in the direction A in an optical disk playback/recorder, the mechanical details of which are not shown. A laser 11 produces a light beam which travels over light paths 12-15 to the surface of the disk 10. The optical system which directs the light to the disk 10 includes collimating and circularizing elements 16, beam splitter 17, prism 18, and focusing lens 19. Light reflected from disk 10 passes over light paths 15, 14, and 13 to polarizing beam splitter 17 where the beam is reflected over light path 20 to beam splitter 21. A portion of the reflected beam is passed over light path 22 to photodetector 23. The remainder of the reflected light is passed over optical path 24 to data detection circuits 25. Data read in analog form from disk 10 are detected by data detection circuits 25 and provided in digital form to a host.

Quadrant photodetectors are commonly employed in optical disk recorders for controlling the focus and track following operations. Commonly an astigmatic optical system is used so that when the light beam is following the track in an ideal manner the quad detector detects light as a circle impinging equally on all four quadrants of the photodetector 23. Off track conditions create a redistribution of the light energy such that certain of the quadrants receive increased light energy depending upon the direction of off track movement. Electrical signals from the quadrant photodetector 23 are supplied to focus and tracking control circuits 26. After seeking to the desired track, a tracking error signal is generated and provided to actuating mechanisms associated with the moveable carriage 31. Carriage 31 responds to the tracking control circuits to move the carriage in either direction B or C to keep the laser beam at the desired position on the track.

Light energy received by photodetector 23 is also used to ascertain the focus condition present at disk 10. The focus error signal supplied to the focus control circuits from photodetector 23 results in the supplying of a signal over line 32 to the actuator for the lens carriage 33. Objective focusing lens 19 is mounted within the lens carriage 33 for movement in directions D and E in response to a signal on line 32. In that manner the light beam produced by laser 11 is maintained in focus on the surface of optical disk 10.

A microprocessor 34 is provided to control all aspects of the operation of the system. Output from processor 34 is provided to control the tracking and focus control circuits 26.

Figure 2:
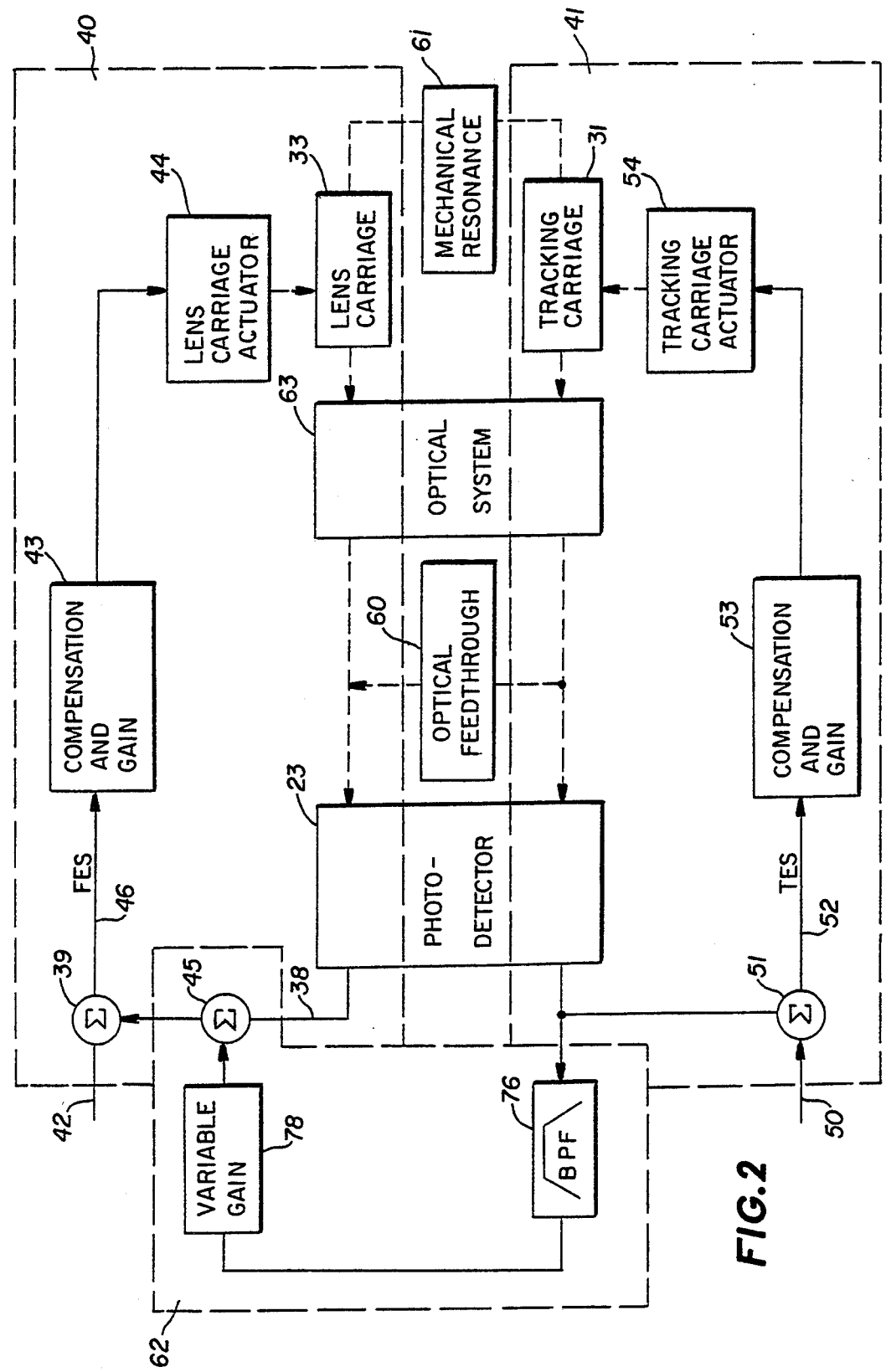
FIG. 2 shows the focus and tracking servo systems and the manner in which they are coupled by mechanical resonance and optical feedthrough. It also shows the feedthrough compensation circuit of the invention.

FIG. 2 is a block diagram showing the major elements of the focus servo system 40 and the tracking servo system 41. Whenever a change in focus occurs, the condition is detected by the photodetector 23 and a signal proportional to the change is present on line 38 to stimulate the focus servo circuit. The signal on line 38 is summed with a reference signal on line 42 by summation circuit 39 to produce a focus error signal (FES) on line 46. The focus error signal is provided to a compensation and gain circuit 43 for development of an appropriately amplified signal to stimulate the focus actuator 44. The actuator 44 is coupled to physically move the lens carriage 33 in order to move the lens 19 either closer to or further away from the surface of the optical disk 10 in order to regain the proper focus condition. As a result of the movement of the lens carriage 33 the photodetector 23 receives an improved light pattern through optical system 63 and thereby produces an altered signal which is summed with the reference signal 42 in summation circuit 39. In that manner the focus error signal on line 46 is changed and the process continues until the focus error signal drops to zero.

In the tracking servo system 41, a reference signal is provided on line 50 which is summed with the output of the photodetector 23 in summation circuit 51 to produce a tracking error signal (TES) on line 52. When the circuit is in balance, the signal produced from the photodetector 23 balances the reference signal such that the tracking error signal is zero, thus indicating that the laser is correctly positioned in the bottom of the groove of the selected track. When a disturbance occurs in the tracking system, the photodetector 23 produces an altered signal such that a tracking error signal (TES) appears on line 52. That signal stimulates the compensation and gain circuit 53 so that the tracking actuator 54 physically moves the tracking carriage 31 so that the laser beam is once again properly positioned. Reflections from the groove are passed through the optical system 63 containing the elements described in FIG. 1, that is lens 19, prism 18, beam splitter 17, and beam splitter 21 to produce the beam 22 for presentation to the photodetector 23. Output of the photodetector 23 is supplied to the summation circuit 51 so that when the proper movement of tracking carriage 31 has occurred the signal produced by the photodetector 23 will once again balance the reference signal 50.

Ideally the focus servo system and the tracking servo system would operate in an isolated fashion one from another. However, as described above, there is optical feedthrough from the tracking system to the focus system and that coupling is illustrated in FIG. 2 by the feedthrough coupling block 60. Both systems use the same optical system 63 to produce a beam for the quadrant photodetector 23 which is also used in both the focus and tracking servo systems. As a consequence, a disturbance of the track position creates a change in the light beam received at the photodetector creating a disturbance in the focus control system. There are various techniques used to eliminate the effect of optical feedthrough and better isolate the focus servo but many of those systems use optical techniques which are costly and require precise alignment procedures. In any event, if optical feedthrough is the only coupling between the focus servo and the tracking servo, movement of the lens carriage does not have a destabilizing effect on the operation of the tracking servo.

FIG. 2 also shows a second coupling between the focus servo and the tracking servo at block 61 due to mechanical resonance. In this instance, movement of the lens carriage 33 induces motion in the tracking carriage 31. When that occurs the output of the photodetector 23 is disturbed, creating a tracking error signal and causing further movement of the tracking system. When further movement of the tracking system occurs, coupling 60 creates a further disturbance in the focusing system, thereby creating a change in the output of the photodetector 23 thus causing a change in the focus error signal and creating further movement of the lens carriage 31. Consequently, when a mechanical resonance coupling between the focus and tracking circuits is present, the combination of the coupling 61 and the coupling 60 creates an unstable condition in which the servo circuits oscillate.

Mechanical resonance coupling between the two circuits can be eliminated by proper mechanical design. However, other considerations (such as a desire to keep component weight as light as possible, cost and component tolerances) may create unacceptable trade-offs in the design of a system in which there is no mechanical resonance. FIG. 2, however, shows that even though mechanical resonance may be present, if the optical feedthrough coupling can be eliminated, the two servo systems would remain stable. Without optical feedthrough coupling, movement of the lens carriage stimulating a movement in the tracking system would be just another error for the tracking system to compensate.

That is, the output of the photodetector would change and the compensation and gain circuit would react to the resulting tracking error signal to cause the actuator to move the tracking carriage such that proper tracking conditions are again established. As noted above, however, elimination of optical feedthrough can be costly. To minimize cost and still prevent destabilization, the invention herein provides electronic compensation for optical feedthrough at only the resonating frequencies by adding the circuit 62 to the system. A bandpass filter 76 is provided to pass a signal at the mechanical resonance frequency derived from the tracking circuit. That signal is gain adjusted by the variable gain circuit 78 and provided to summation circuit 45 to balance the optical feedthrough signal supplied through the coupling 60. The result is to eliminate optical feedthrough at the range of frequencies in which mechanical resonance occurs so that the focus error signal does not reflect an optical feedthrough component at those particular frequencies. The result is an electronic elimination of optical feedthrough for those particular frequencies at which coupling 61 occurs. In that manner, the two servo systems are stabilized.

FIG. 3 illustrates a frequency trace for the tracking error signal resulting from a focus error signal induced into the focus servo system. Experimentally, the trace represents the TES when a back and forth movement of the lens carriage is created. The resulting trace shown in FIG. 3 for a particular optical disk system under test shows that mechanical resonance occurs in a range of frequencies from 2–10 kilohertz. Peak resonating conditions occur at approximately 6 and 8.5 kilohertz. FIG. 3 therefore shows the coupling effect 61 of lens carriage movement on the tracking system.

FIG. 4 shows the phase relationship between the tracking error signal and the focus error signal. This trace also reflects conditions present in the tracking servo system from movement of the lens carriage. It illustrates the fact that the phase changes so rapidly that there is very little possibility of designing a circuit to counteract it.

Figure 5:
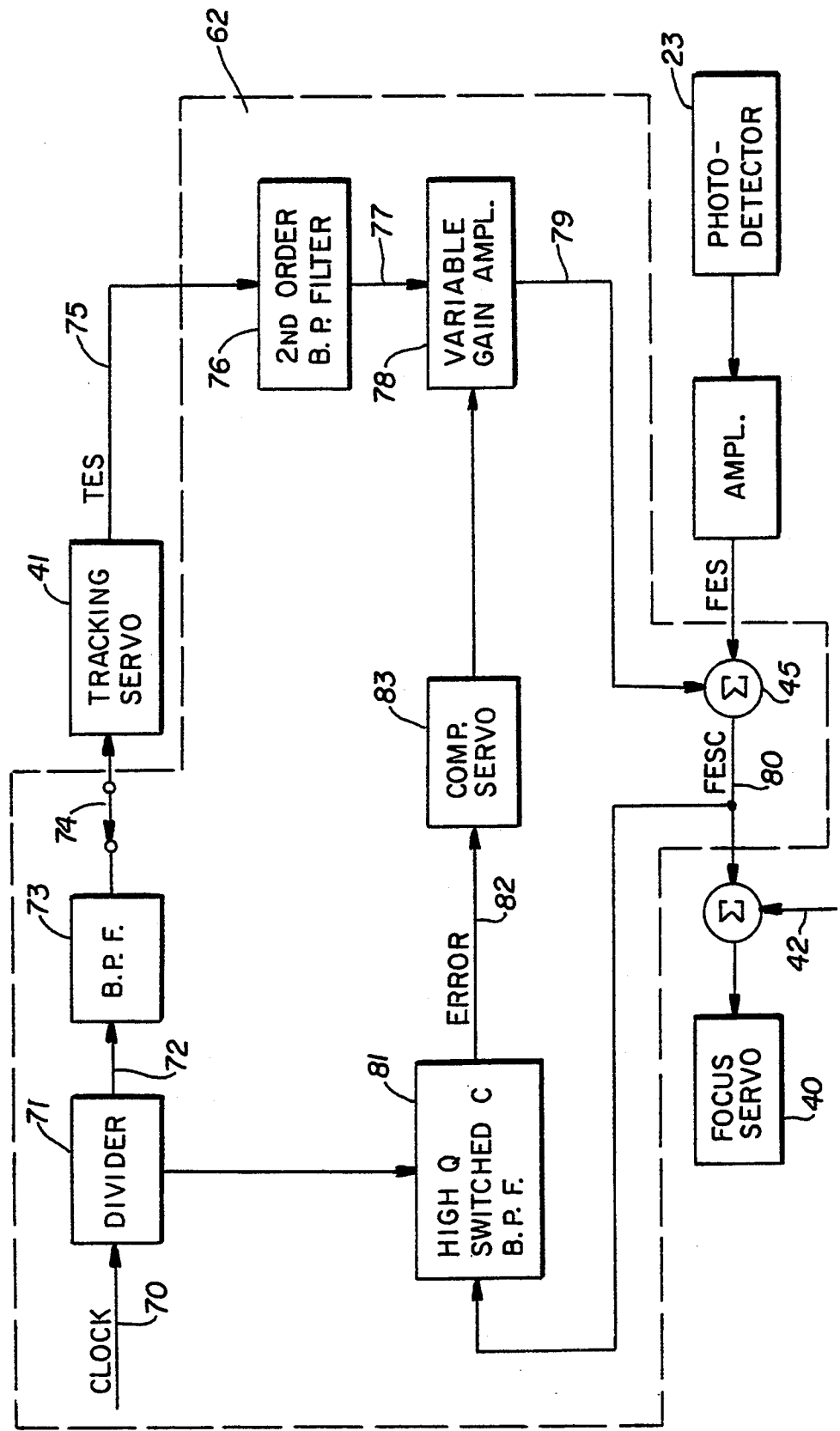
FIG. 5 is a detailed diagram of the invention.

FIG. 5 illustrates in detail the electrical circuit 62 designed for compensating optical feedthrough for the frequency range of mechanical resonance. Focus servo system 40 and the tracking servo system 41 are shown in block diagram form. The feedthrough compensation circuit 62 is expanded to show the details thereof. A system clock signal is provided on line 70 to a divider 71 in order to produce a frequency in the range of frequencies at which mechanical resonance is present. For the optical disk drive shown in FIG. 2, a convenient frequency derived from the clock frequency satisfying the criteria is provided at 4 kilohertz on line 72. That signal is further filtered at band pass filter 73 to produce a sinusoidal waveform and used to disturb the tracking servo system through switch 74. By disturbing the tracking servo system, a tracking error signal is produced on line 75 which is filtered by the second order band pass filter 76 to adjust any slight difference in phase between the tracking error signal and an optical feedthrough signal. Bandpass filter 76 passes frequency components of the tracking error signal from 2 kHz to 10 kHz. The filtered tracking error signal on line 77 is applied to a variable gain amplifier 78 from which a signal is derived on line 79 of a proper amplitude, frequency and phase to exactly compensate for the optical feedthrough signal coupled into the focus servo through coupling 60. The compensation signal on line 79 is summed by summation circuit 45 with the focus error signal output of the photodetector 23 in order to produce a focus error signal compensated (FESC) on line 80. That signal is summed with the reference signal on line 42 by summation circuit 39 and provided to the focus servo system 40. As a consequence, the signal presented to the focus servo system 40 is devoid of the effect of optical feedthrough at the chosen frequency. In that manner, the effect of mechanical resonance is compensated by the elimination of optical feedthrough.

Since every optical disk and every disk drive is different, means must be devised to adjust the amplitude of the signal on line 79 so that it matches the amplitude of the optical feedthrough signal. A calibrating circuit is provided for that purpose. The focus error signal compensated (FESC) output on line 80 is provided to a high Q switched capacitance band pass filter 81. High Q filter 81 also receives the divided clock frequency at 40 kilohertz to set its center frequency so that it tracks 4 kHz with no error. The output of the filter 81 on line 82 is that component of the compensated focus error signal at 4 kHz which has been inaccurately compensated. If there is an uncompensated FESC signal at 4 kilohertz, that error signal on line 82 is provided to the compensation servo circuit 83 for changing the gain of amplifier 78 so that the error signal 82 is eliminated. In that manner the amplitude of the adjusted tracking error signal present on line 79 is calibrated to match an opposite polarity optical feedthrough signal present as input at summation circuit 45.

While the invention has been described above with respect to specific embodiments, it will be understood by those skilled in the art that various changes in form and details may be made therein without departing from the spirit and scope of the invention which receives definition in the following claims.

We claim:

1. An optical disk apparatus including a light source, an optical system for directing a light beam produced by said light source to the surface of an optical disk mounted in said apparatus, said disk having tracks for recording data, said optical system including movable elements for directing said beam onto said surface at a desired track position and an objective lens for focusing said beam onto said surface, photodetector means for receiving light reflected from said surface and for producing a focus error signal (FES) proportional to an out-of-focus condition, and a track error signal (TES) proportional to distance from said desired track position comprising:

focus control means for moving said objective lens in response to said FES to maintain an in-focus condition;

tracking control means for moving said movable elements in response to said TES to direct said beam onto said surface at said desired track position;

said focus control means including circuit means electronically establishing a compensation signal for compensating an FES component induced into said focus control means by the presence of a tracking error signal, said circuit means including a band pass filter for establishing the selected frequency of said FES component to be compensated, said selected frequency within the range of frequencies at which mechanical resonance conditions occur between said focus control means and said tracking control means, and an amplifier for setting the magnitude of said compensation signal.

2. The apparatus of claim 1 wherein said focus control means includes a lens carriage for mounting said objective lens and a first actuator for moving said lens carriage to position said lens closer to or farther from the disk surface in response to said FES.

3. The apparatus of claim 2 wherein said tracking control means includes a tracking carriage onto which are mounted said movable elements, and a second actuator for moving said tracking carriage across the surface of said disk in response to said TES.

4. The apparatus of claim 3 wherein said focus control means further includes calibration circuit means for changing the magnitude of said compensation signal at said selected frequency to match a generated TES component at said frequency for each optical disk mounted in said apparatus.

5. The apparatus of claim 4 wherein said calibration circuit further includes a second band pass filter for providing a disturbance signal at said selected frequency to said tracking control means to induce a TES with a component at said selected frequency, said calibration circuit further including means for altering the magnitude of said compensation signal to match the induced TES component at said selected frequency.

6. The apparatus of claim 1 wherein said focus control means further includes calibration circuit means for changing the magnitude of said compensation signal at said selected frequency to match a generated TES component at said frequency for each optical disk mounted in said apparatus.

7. The apparatus of claim 6 wherein said calibration circuit further includes a second band pass filter for providing a disturbance signal at said selected frequency to said tracking control means to induce a TES with a component at said selected frequency, said calibration circuit further including means for altering the magnitude of said compensation signal to match the induced TES component at said selected frequency.

8. A system for compensating optical feedback over a frequency range at which the amplitude of mechanical resonance reaches peak value, said system including a light source, an optical system for directing a light beam produced by said light source to a target, said optical system including moveable elements for directing said beam onto the surface of said target at a desired position and a moveable objective lens for focusing said beam onto said surface, photodetector means for receiving light reflected from said surface and for producing a focus error signal (FES) proportional to an out-of-focus condition, said photodetector means also producing a position error signal proportional to the distance of said beam from said desired position; said system comprising:

focus control means for moving said objective lens in response to said FES to maintain an in-focus condition;

position control means for moving said movable elements in response to said position error signal to direct said beam onto said surface at said desired position;

said focus control means including circuit means electronically establishing a compensation signal for compensating an FES component induced into said focus control means by the presence of a position error signal, said circuit means including a band pass filter for establishing the selected frequency of said FES component to be compensated, said selected frequency within the range of frequencies at which mechanical resonance conditions occur between said focus control means and said position control means, and an amplifier for setting the magnitude of said compensation signal.

9. The system of claim 8 wherein said focus control means includes a lens carriage for mounting said objective lens and a first actuator for moving said lens carriage to position said lens closer to or farther from the disk surface in response to said FES.

10. The system of claim 9 wherein said position control means includes a tracking carriage onto which are mounted said movable elements, and a second actuator for moving said tracking carriage across the surface of said target in response to said position error signal.

11. The system of claim 10 wherein said focus control means further includes calibration circuit means for changing the magnitude of said compensation signal at said selected frequency to match a generated component of said position error signal at said frequency.

12. The system of claim 11 wherein said calibration circuit further includes a second band pass filter for providing a disturbance signal at said selected frequency to said position control means to induce a position error signal with a component at said selected frequency, said calibration circuit further including means for altering the magnitude of said compensation signal to match the induced position error signal component at said selected frequency.

13. The system of claim 8 wherein said focus control means further includes calibration circuit means for changing the magnitude of said compensation signal at said selected frequency to match a generated component of said position error signal at said frequency.

14. The system of claim 13 wherein said calibration circuit further includes a second band pass filter for providing a disturbance signal at said selected frequency to said position control means to induce a position error signal with a component at said selected frequency, said calibration circuit further including means for altering the magnitude of said compensation signal to match the induced position error signal component at said selected frequency.

* * * * *